United States Patent
Gray et al.

(10) Patent No.: US 6,674,403 B2
(45) Date of Patent: Jan. 6, 2004

(54) POSITION DETECTION AND LOCATION TRACKING IN A WIRELESS NETWORK

(75) Inventors: Matthew K. Gray, Somerville, MA (US); Jeffrey J. Peden, II, Lexington, MA (US); Yonald Chery, Malden, MA (US)

(73) Assignee: Newbury Networks, Inc., Boston, MA (US)

( * ) Notice: Subject to any disclaimer, the term of this patent is extended or adjusted under 35 U.S.C. 154(b) by 0 days.

(21) Appl. No.: 10/235,338

(22) Filed: Sep. 5, 2002

(65) Prior Publication Data

US 2003/0043073 A1 Mar. 6, 2003

Related U.S. Application Data

(60) Provisional application No. 60/317,480, filed on Sep. 5, 2001.

(51) Int. Cl.[7] ................................................. G01S 3/02
(52) U.S. Cl. .................... 342/463; 342/453; 342/465
(58) Field of Search .............................. 342/463, 465, 342/453; 455/456, 457

(56) References Cited

U.S. PATENT DOCUMENTS

| | | | |
|---|---|---|---|
| 5,835,061 A | 11/1998 | Stewart | |
| 5,969,678 A | 10/1999 | Stewart | |
| 5,977,913 A | * 11/1999 | Christ | 342/465 |
| 6,259,405 B1 | 7/2001 | Stewart et al. | |
| 6,317,599 B1 | 11/2001 | Rappaport et al. | |
| 6,326,918 B1 | 12/2001 | Stewart | |
| 6,456,239 B1 | * 9/2002 | Werb et al. | 342/463 |

OTHER PUBLICATIONS

A data fusion architecture for enhanced position estimation in wireless networks, T. Kleine–Ostmann et al., IEEE Communications Letters, vol. 5(8), p. 343–345, Aug. 2001.*

Ultra wideband (UWB) Radios for Precision Location, Third IEEE Workshop on Wireless Local Area Networks, Sep. 27–28, 2001.

Barber, S., Monitoring 802.1 Networks, IEEE 802.11, Sydney, NSW, May 13–17, 2002.

Bahl, P. and V. Padmanabhan, Radar; An In–Building RF–based User Location and Tracking System, Microsoft Research, Mar., 2000.

Bahl, P. and V. Padmanabhan, A Software System for Locating Mobile Users: Design, Evaluation, and Lessons, Microsoft Research, Apr., 2000.

Latvala, J., J. Syrjarinne, H. Ikonen and J. Niittylahti, Evaluation of RSSI–based Human Tracking, Proceedings of the 2000 European Signal Processing Conference, Sep., 2000.

(List continued on next page.)

Primary Examiner—Thomas H. Tarcza
Assistant Examiner—Fred H. Mull
(74) Attorney, Agent, or Firm—McDermott, Will & Emery

(57) ABSTRACT

A system and method for performing real-time position detection and motion tracking of mobile communications devices moving about in a defined space comprised of a plurality of locales is provided. A plurality of access points are disposed about the space to provide an interface between mobile devices and a network having functionality and data available or accessible therefrom. Knowledge of adjacency of locales may be used to better determine the location of the mobile device as it transitions between locales and feedback may be provided to monitor the status and configuration of the access points.

29 Claims, 8 Drawing Sheets

OTHER PUBLICATIONS

Latvala, J., J. Syrjarinne, S. Niemi and J. Niittylahti, Patient Tracking in a Hospital Environment Using Extended Kalman–filtering, Proceedings of the 1999 Middle East Conference on Networking, Nov., 1999.

Myllymaki, P., T. Roos, H. Tirri, P. Misikangas and J. Sievanen, A Probabilistic Approach to WLAN User Location Estimation, Third IEEE Workshop on Wireless Local Area Networks, Sep. 27–28, 2001.

Bahl, P. and V. Padmanabhan, User Location and Tracking in an In–Building Radio Network, Microsoft Research, Feb., 1999.

* cited by examiner

POSITION DETECTION AND LOCATION TRACKING IN A WIRELESS NETWORK

CROSS REFERENCES TO RELATED APPLICATIONS

This application claims the benefit of priority under 35 U.S.C. §119(e) from co-pending, commonly owned U.S. provisional patent application serial No. 60/317,480, entitled STATISTICAL POSITION DETECTION & LOCATION TRACKING USING SIGNAL-STRENGTH DATA FROM COMMUNICATIONS NETWORK, filed Sep. 5, 2001.

FIELD OF THE INVENTION

The present invention relates to the field of real-time position detection and motion tracking of wireless communications devices.

BACKGROUND

Communications with wireless devices has quickly become a ubiquitous part of modern life. Such wireless devices can take any of a number of forms. As examples, wireless devices may include cellular telephones and pagers, as well as various types of Internet, Web, or other network enabled devices, such as personal digital assistants (PDAs). Rapid growth has come in the mobile telephone realm and in the realm of other personal and business computing devices. The number of cellular telephone customers, for example, has grown exponentially over the past few years, so too has the number of wireless personal and business computing devices. Any of these network enabled devices may include Internet or Web functionality. Generally, a wireless device configured for transmitting, receiving, accessing, or exchanging data via a network may be referred to as a "mobile device" and communications between mobile devices may be referred to as "wireless communications".

As part of the technical development of the networks to meet the demand for mobile communications, carriers have migrated from an analog-based technology to several digital transport technologies, wherein digital data is "packetized" and transmitted across digital networks. Newer versions of digital wireless communication networks support a variety of data communication services that are intended to extend the common data communication capabilities of the wired domain to the wireless mobile domain.

The current trend in the cellular realm is toward the Third Generation of Wireless Telephony (3G) networks (e.g., 3G-1x networks). The 3RD Generation Partnership Project 2 (3GPP2) standard entitled Wireless IP Network Standard, 3GPP2 P.S0001-A, Version 3.0.0, © 3GPP2, version date Jul. 16, 2001 (the "3GPP2 Standard", a.k.a. the IS-835 Standard") codifies the use of mobile IP in a 3G-1x packet data network, also referred to as a code division multiple access (CDMA) or CMDA2000-1x packet data network.

In the personal and business realm, where wireless communication can take place in a localized area via local communications network, the IEEE 802.11 standard is prevalent. A localized area may be a building, an area within a building, an area comprising several buildings, outdoor areas, or a combination of indoor and outdoor areas. Most modern means of position detection and motion tracking techniques of an object either involve: 1) signal timing analysis, such as time (difference) of arrival (TOA or TDOA) based measurements, such as global positioning systems (GPS); 2) signal frequency shift analysis, such as RADAR; 3) the use of predetermined signal beacons for active or passive detection, such as interrupting a beam of light upon entry or exit of a space; or 4) having a network of receivers that detect presence of a mobile beacon signal traveling through a space, such as infrared transmitters on PDAs or cellular telephones within reach of local cellular tower, or triangulation via a combination of these or related methods.

Most of these techniques are application-specific to the task of measuring position and often serve no other function, except in the case of a mobile phone as noted above, where the location of a cellular phone can be detected at a coarse scale of hundreds of feet, concluding it is in the vicinity of a given tower. Some of these techniques are unavailable in certain spaces such as the use of GPS indoors or underground, or are impractical because of interference, signal multi-path effects, or because the optimal speed profiles for the objects being tracked (such as RADAR) do not match the motive behavior of the objects. Lastly, merely the deployment of a network of sensors as described above for position detection of a mobile device could be prohibitively expensive and impractical for this single function.

In some settings, detection and location within a defined local area is performed using a local area network (LAN) comprised of a set of "access points" (APs). The APs are communication ports for wireless devices, wherein the communication occurs across an "air link" between the wireless device and the APs. That is, APs pass messages received from the wireless device across the LAN to other servers, computers, applications, subsystems or systems, as appropriate. The APs are bi-directional, so also configured to transmit to the wireless device. Typically, the APs are coupled to one or more network servers, which manage the message traffic flow. Application servers may be coupled to or accessed via the network servers, to provide data or typical application functionality to the wireless device.

In such systems, the process of defining the local area (e.g., room layouts, ground layouts, and so on) to the network is often referred to as "training" the area or system. The area is divided up into spaces, which wireless devices transition between as they migrate through the trained area. The location and detection within the trained area is typically determined as a function of the signal strength from the wireless device with respect to one or more APs. The APs are configured to determine the signal strength and pass it on to a back-end subsystem for processing.

Location and detection are typically determined as a function of received signal strength indicator (RSSI) values obtained from the communications between the wireless device and the LAN. As a general rule, the higher the signal strength, the closer a transmitting wireless device is presumed to be to an AP. Changes in the signal strength as the wireless device moves about the trained area allows for tracking. If there are at least three APs that receive the signals from the wireless device, trilateration can be used to determine the location of the device within the trained area. Trilateration is a method of determining the position of the wireless device as a function of the lengths between the wireless device and each of the APs.

Trilateration calculations are performed by the wireless device using the RSSI data, which must be configured with appropriate software (e.g., a client-side module) to accomplish such tasks. As a result, the demands on the wireless device are increased. Furthermore, while detection and tracking are desired for substantially all wireless devices within the trained area, it is much more difficult to achieve, since the many types of wireless devices may all have different configurations.

SUMMARY OF THE INVENTION

A system and method are provided that allow for network-based position detection and tracking of a wireless mobile (or client) device within a defined space, e.g., a mobile device detection and tracking system. Preferably, the mobile device needs no special client-side configuration, modules, or programs to be detected and tracked, since detection and tracking are preformed on the network side of the interface. The availability of applications and access to data may be selectively provided or inhibited as a function of the location of the mobile device and an identity of the mobile device or its user, or both. The present inventive approach to real-time position detection or motion tracking can be applied to outdoor wide-area communications media, such as cellular or pager networks or indoor/outdoor to wireless local area networks (LAN) and communications such as IEEE 802.11 or "Bluetooth".

The mobile device may be any known portable or transportable device configured for wireless communications, such as a mobile telephone, personal digital assistant (PDA), pager, e-mail device, laptop, or any Web enabled device. Many of such devices may be handheld devices, but other wireless devices that are not of such a compact size could also be detected and tracked. As wireless devices, the mobile devices are configured to communicate with a network through a wireless interface.

The mobile device detection and tracking system includes a network, a plurality of detectors (e.g., access points (APs)), and at least one processing system. The processing system preferably includes or supports a user interface and includes memory to facilitate the initial setup, operation, and maintenance of the system. The network couples a set of selectively distributed access points to the processing system. The network may also include or have access to a variety of functionality and data, which may be hosted on the network or on subsystems or on systems accessible via the network, possibly via another one or more networks.

The mobile device detection and tracking system combines a digital definition of the physical space with a statistical signal strength model to provide a context within which mobiles devices may be detected and tracked. The digital form or map of the physical space preferably includes the identification of permanent obstructions that will effect the transmission and reception capabilities of the access points, e.g., walls, columns, and so on. The signal strength model defines, for each access point within the physical space, a pattern of signal strength reception that is anticipated from a mobile device transmitting within the space, taking into account the obstructions and placement of the access points. With a plurality of access points, a plurality of signal strength patterns will be defined, several of which will, typically, overlap to some extent.

The defined space is comprised of a set of defined regions, areas or locations (collectively referred to as "locales"). A locale may be defined as an interior or exterior space or location, or a combination thereof. For example, a conference room may be defined as a locale. Each locale is defined within the system in relationship to the digital form of the physical space. Locales may be defined either prior to or after generation of the signal strength model. Typically, once the digital form of the space is formed, the locales are defined and the statistical signal strength model is then defined. In other forms, an iterative process of defining locales, generating the signal strength model, and (optionally) positioning the access points may be used.

With the digital form of the physical space defined, the signal strength model can be determined. The process of generating a signal strength model is referred to as "training" the area or system. In accordance with the present invention, the signal strength model can be created in one of at least two manners. In a first manner, access points are installed in the physical space and actual signal strength data is collected through migration of a transmitting mobile device through the space. The actual signal strength data received from the access points are used to build a statistical signal strength model associated with the digital form of the physical space. Any one or more of a variety of known statistical modeling approaches may be used to build the signal strength model, such as a Markov model.

A second manner of building the statistical model includes using simulated access points and simulated mobile device readings within the context of the digital form representation of the physical space. In such a case, the system assumes certain reception and transmission characteristics of the access points and of the mobile devices within the context of the space in digital form. The statistical signal strength model is generated as a function of these assumptions. Preferably, the system allows for editing the assumptions (including the positioning of obstructions and access points) to yield different statistical models using the user interface of the system.

Accordingly, in some forms, the mobile device detection and tracking system may include a module for determining the placement of the access points within the defined space. In such a case, the space in digital map is defined, including a definition of the obstructions. Obstructions may be assigned values relating to the amount of interference they tend to provide. For example, a brick wall typically provides a greater amount of interference than does a window. Analyzing the interference characteristics in light of a range of signal strengths from a foreseeable set of mobile devices and in light of the detection and transmission characteristics of the access points, allows access point placement to be determined. If there are detectors having different detection and transmission characteristics identified in the system, the system may not only determine placement, but also selection of detectors. In some forms, the system may also determine placement of the detectors with respect to the locales.

With the defined space having been trained, position detection and motion tracking are accomplished within and among the locales by processing actual signal strength data of a mobile device as it moves about or resides in the defined space, and comparing the actual data against the known statistical signal strength model. At any one time, a mobile device transmitting in the trained space may be detected by a plurality of detectors, which may be in the same or different locales. A comparison of the actual signal strength data at each access point receiving the mobile device's signal with the signal strength patterns (included in the signal strength model) of those access points allow for a determination of the real-time location of the mobile device within the defined space. Such analysis, when performed overtime, allows tracking of the mobile device within and among the locales.

To improve the accuracy and reliability of tracking, the concept of locale adjacency may be used. That is, if a locale "A" is only adjacent to a locale "B" and a locale "C" and, according to signal strength data, the mobile device could be in locale B or a locale "E", knowing that the previous locale of the mobile device was locale A allows the system to accurately determine that the mobile device is currently in local B, and not locale E.

The concept of adjacency may be implemented in a state-based approach. In such a case, each locale may be uniquely modeled as state within a state diagram. Since only a finite number of known next states and previous states can exist for each state, a current state can be determined with greater reliability given knowledge of the previous state and its subset of allowable next states.

In various forms of the present invention, a combination of approaches may be implemented to locate and track a mobile device through the defined space and from locale to locale. For example, using clustering statistics of received signal strength indicator (RSSI) data from one or more access points, a determination of the location of the mobile device can be made with relatively high accuracy. Additionally, a trilateration analysis of RSSI data received from three different detectors can be performed, wherein the location of the mobile device can be determined as a function of the length of the sides of a triangle formed by the three access points. The results of the clustering statistics and the trilateration are combined to increase the accuracy of the overall determination of the location of the mobile device. This approach can also be performed over time for improved tracking.

Various forms of the present invention may include a feedback subsystem or monitor that monitors the status of the access points. For instance, such a subsystem may be configured to determine if an access point is malfunctioning, turned off or inoperable, if a new access point has been added, or some combination of the foregoing. In such a form, a feedback path is provided between the access points and a monitoring processor, manager, module, program, or subsystem (collectively "monitoring module"). The monitoring module obtains status data provided by each access point, which is used for the above determinations, and produces status messages, error messages or both. The messages may come, as an example, in the form of an e-mail or a telephone alert to a network administrator, technician, manager, security personnel, or some combination thereof. In some forms, a system and method in accordance with the present invention may adjust the statistical model in response to loss or malfunctioning of one or more access points.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE PREFERRED EMBODIMENTS

A system and method are provided that allow for network-based position detection and tracking of a wireless mobile (or client) device within a defined space, e.g., a mobile device detection and tracking system. Preferably, the mobile device needs no special client-side configuration, modules, or programs to be detected and tracked, since detection and tracking are preformed on the network side of the interface. The availability of applications and access to data may be selectively provided or inhibited as a function of the location of the mobile device and (optionally) an identity of the mobile device or its user, or both. The present inventive approach to real-time position detection or motion tracking can be applied to outdoor wide-area communications media, such as cellular or pager networks or indoor/outdoor to wireless local area networks (LAN) and communications such as IEEE 802.11 or "Bluetooth", as examples.

Figure 1:
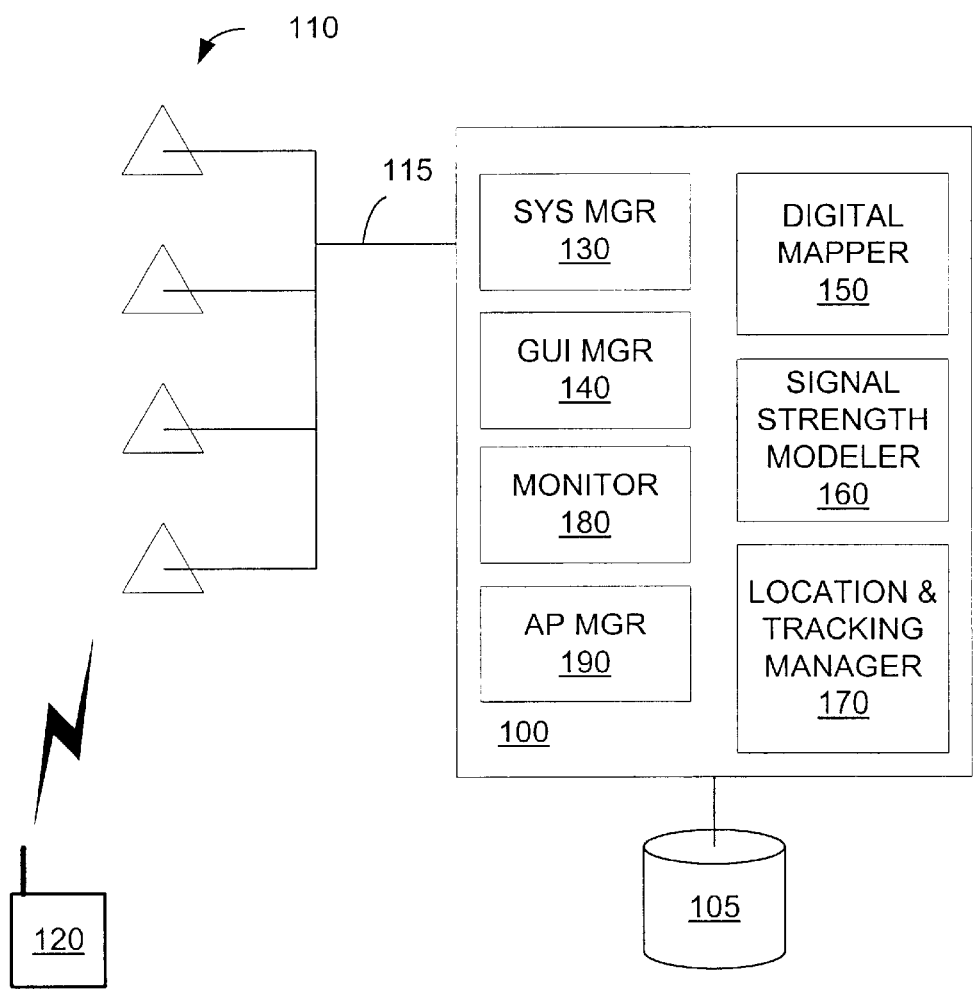
FIG. 1 is a functional block diagram of mobile device detection and tracking system in accordance with the present invention.

FIG. 1 provides a representative top-level diagram of a mobile device detection and tracking system 100, in accordance with the preferred embodiment. Generally, a network 115 couples a plurality of detectors, e.g., access points (APs) 110, to system 100. The access points are selectively distributed throughout the defined space to provide wireless service to one or more mobile devices 120 operating therein. The mobile device 120 may be any known portable or transportable device configured for wireless communications, such as a mobile telephone, personal digital assistant (PDA), pager, e-mail device, laptop, or any Web enabled device. Many of such devices may be handheld devices, but other wireless devices that are not of such a compact size could also be detected and tracked. As wireless devices, the mobile devices 120 are configured to communicate with network 115 through a wireless interface, such as access points 110.

The access points 110 preferably include receiving and transmitting means (e.g., transceivers) to facilitate bi-directional interaction with mobile devices 120. For example, in the preferred form, access points 110 may be an AP1000 provided by Agere Systems of Allantown, Pa., USA. Such access points are configured to determine the signal strength of a mobile device from a received signal, and are known in the art.

Depending on the embodiment, mobile device detection and tracking system 100 may include several or all of the functional modules shown in FIG. 1. Generally, a system manager 130 may oversee and task the other modules and provide an interface to other systems or applications. A user interface (UI) manager, in this example a graphical user interface (GUI) 140, is provided to provide data to generate and support display screens useful is setting up, operating and maintaining the mobile device detection and tracking system 100. The GUI manager 140 may provide data to a terminal or computer included as part of the mobile device detection and tracking system, to mobile devices 120, or to other devices coupled to network 115.

A digital mapper 150 is included to accept or facilitate a definition of the defined space in digital form. The digital mapper 150 may receive tasking via the system manager 130 and may interact with the GUI manager 140 to facilitate generation and viewing of the digital map. The digital map may be formed by, for example, translating an architectural drawing into digital form or making use of an existing digital map of the defined space. In other forms, using typical computer aided design (CAD) tools, a digital map may be formed. Preferably, digital mapper 150 includes tools to accommodate any of the foregoing approaches to accepting or generating a digital map of the defined space, which is stored in memory 105.

Typically, the defined space is comprised of a set of defined regions, areas or locations (collectively referred to as "locales"). Each locale is defined within the system in relationship to the digital form of the physical space. A locale may be defined as an interior or exterior space or location, or a combination thereof. For instance, a conference room, office, or waiting area may each be defined as a single locale within a defined space. Locales may be defined either prior to or after generation of the signal strength model. However, typically, once the digital map of the space is formed, the locales are defined and the statistical signal strength model is then defined. In other forms, an iterative process of defining locales, generating the signal strength model, and (optionally) positioning the access points 120 may be used. Depending on the embodiment, a user may be have different privileges, access, or rights with respect to functionality or data, depending in the current locale of the user. Transitioning from one locale to another locale may cause loss of privileges, rights, and access, and in some cases, selective loss or delivery of data.

Figure 2:
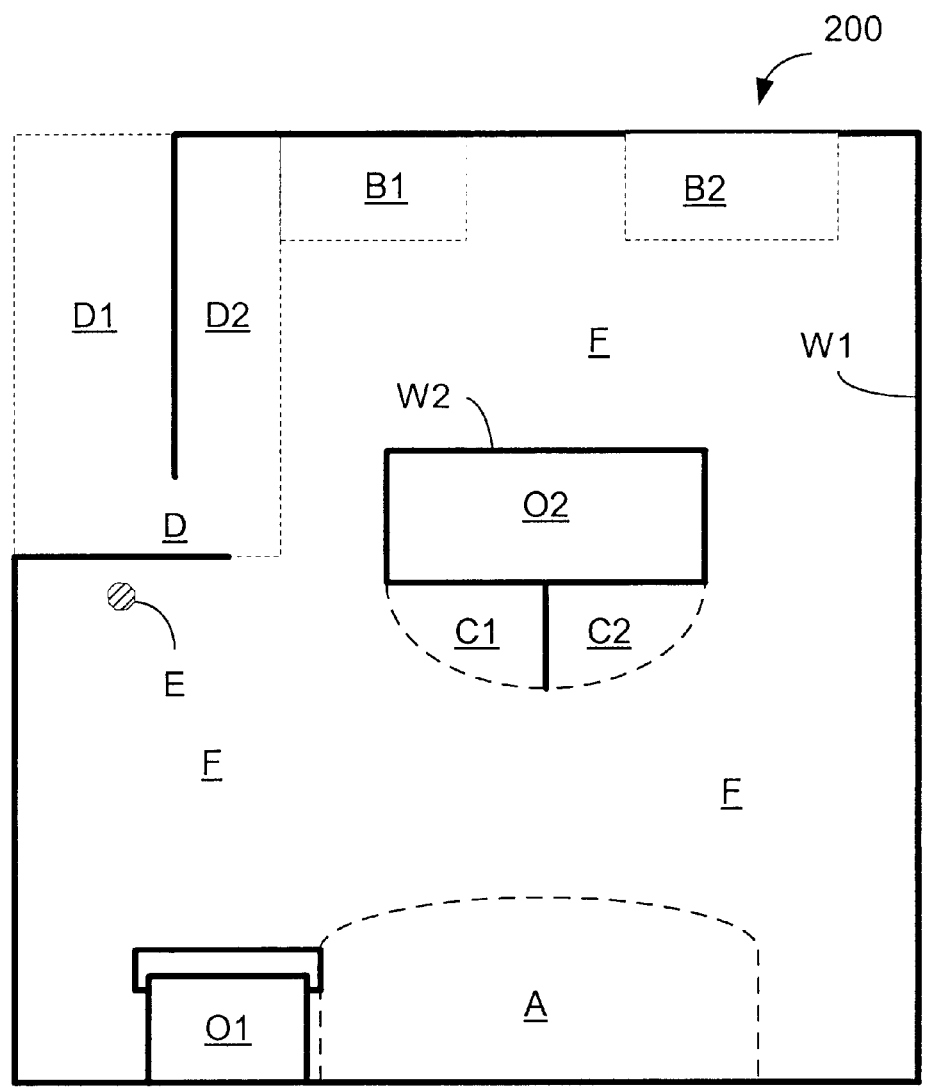
FIG. 2 is a diagram of a defined space in digital form.

As an example, FIG. 2 shows a defined space 200 comprised of a plurality of locales and obstructions. Locale boundaries are depicted as dashed lines. Obstructions are depicted with heavy solid lines (e.g., walls "W1" and "W2"), or enclosed with heavy solid lines (e.g., obstructions "O1" and "O2"). Obstructions O1 and O2 may be elevator shafts, heating ducts, or equipment closets, as examples. Locale "A" may be a conference room. Locals "B1" and "B2" may be offices. Locales "C1" and "C2" may be separate waiting areas. Locale "D" may be an area that includes exterior space "D1" and interior space "D2". Locale "E" may be a location, i.e., a very small area or spot. And space "F" may be a common area locale, or an area for which a locale is not defined.

The mobile device detection and tracking system 100 combines a statistical signal strength model with the digital definition of the physical space to provide a context within which mobiles devices 120 may be detected and tracked. The signal strength model defines, for each access point 110 within the physical space, a pattern of signal strength reception that is anticipated from a mobile device 120 transmitting within the space, taking into account the obstructions and placement of the access points 110. With a plurality of access points, a plurality of signal strength patterns will be defined, several of which will, typically, overlap to some extent.

Figure 3A:
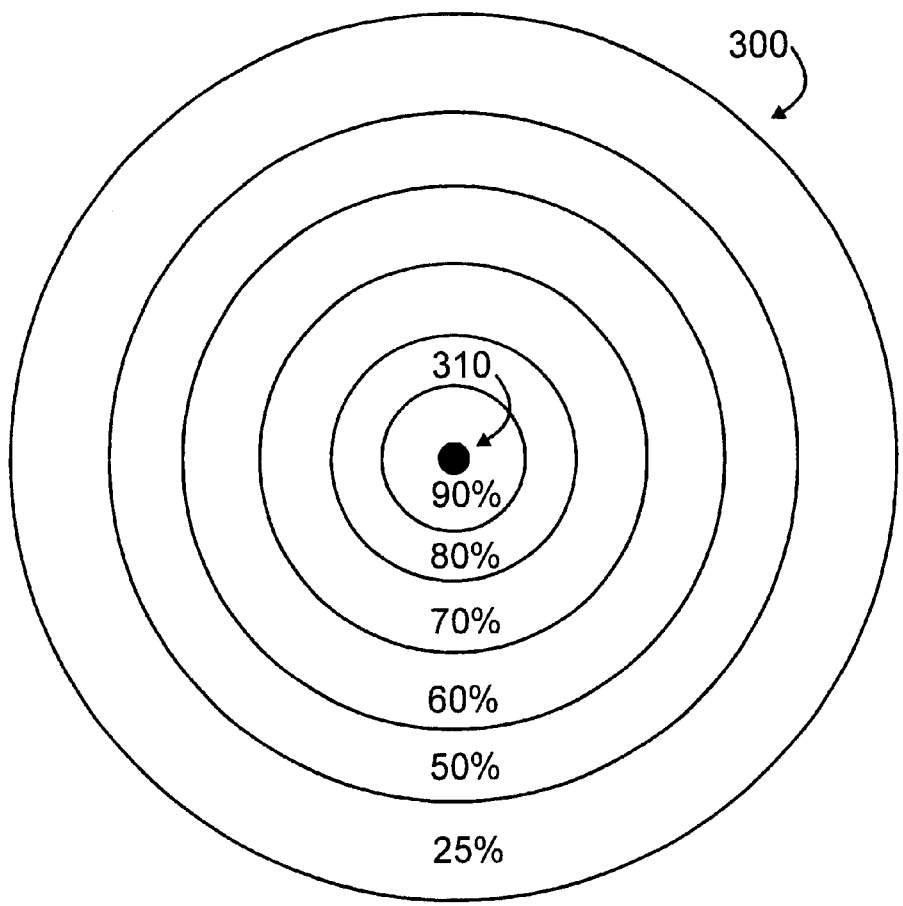
FIG. 3A shows a signal strength pattern around a communications source or access point with no environmental interference and FIG. 3B shows multiple overlapping signal strength patterns.

FIG. 3 illustrates a signal strength pattern 300 around an access point 310 with no environmental interference. Signal strength pattern 300 represents an ideal, where signal strength alone would merely indicate proximity to the source 310. That is, ideally, the closer to the source 310, the stronger the signal, and the higher the reading. However, in a practical deployment, a communications source or access point is likely to encounter some environmental impact, causing absorption, attenuation, reflection or a combination of these factors on the communications medium in different areas throughout the defined space accessible by the signal, such as would occur in digital map 200.

Figure 4:
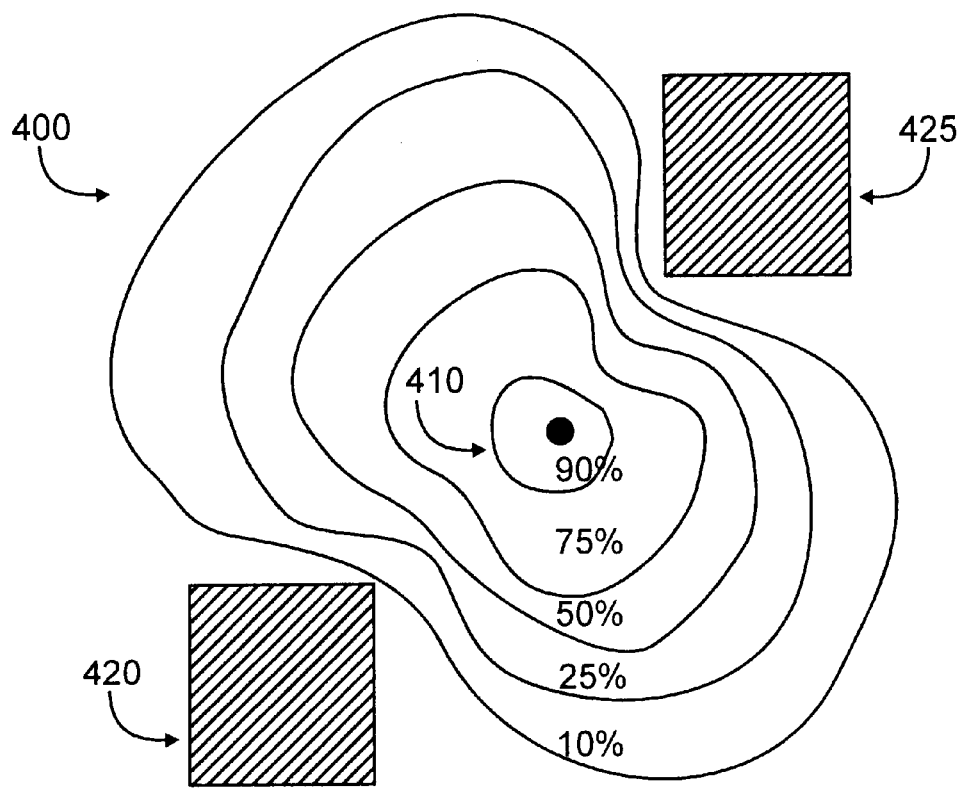
FIG. 4 shows a distorted signal strength pattern around a communications source or access point that is the result of environmental obstructions that causes either reflection or signal attenuation.

FIG. 4 shows a distorted signal strength pattern 400 around access point 410 that is the result of environmental obstructions 420 and 425. The resulting non-uniformity provides an opportunity for local position detection since, depending on the environment, locales (or other locations of interest within the defined space) may have highly distinguishable non-uniform signal strength profiles. Because the defined space may impose inherent restrictions on where the mobile device 120 can and cannot travel (e.g. corridors, walls, rooms, and so on), there is the potential for increasing the number of locales having distinct signal strength profiles. In addition, since it is more likely that the mobile device 120 will travel by passing through adjacent or connected locales, i.e., the device will not be in one area at one moment and then instantaneously appear two or more locales away, this further increases the ability to accurately identify the location and motion of the mobile device 120 within the defined space, since only certain signal strength profile transitions will likely be observed.

Figure 5:
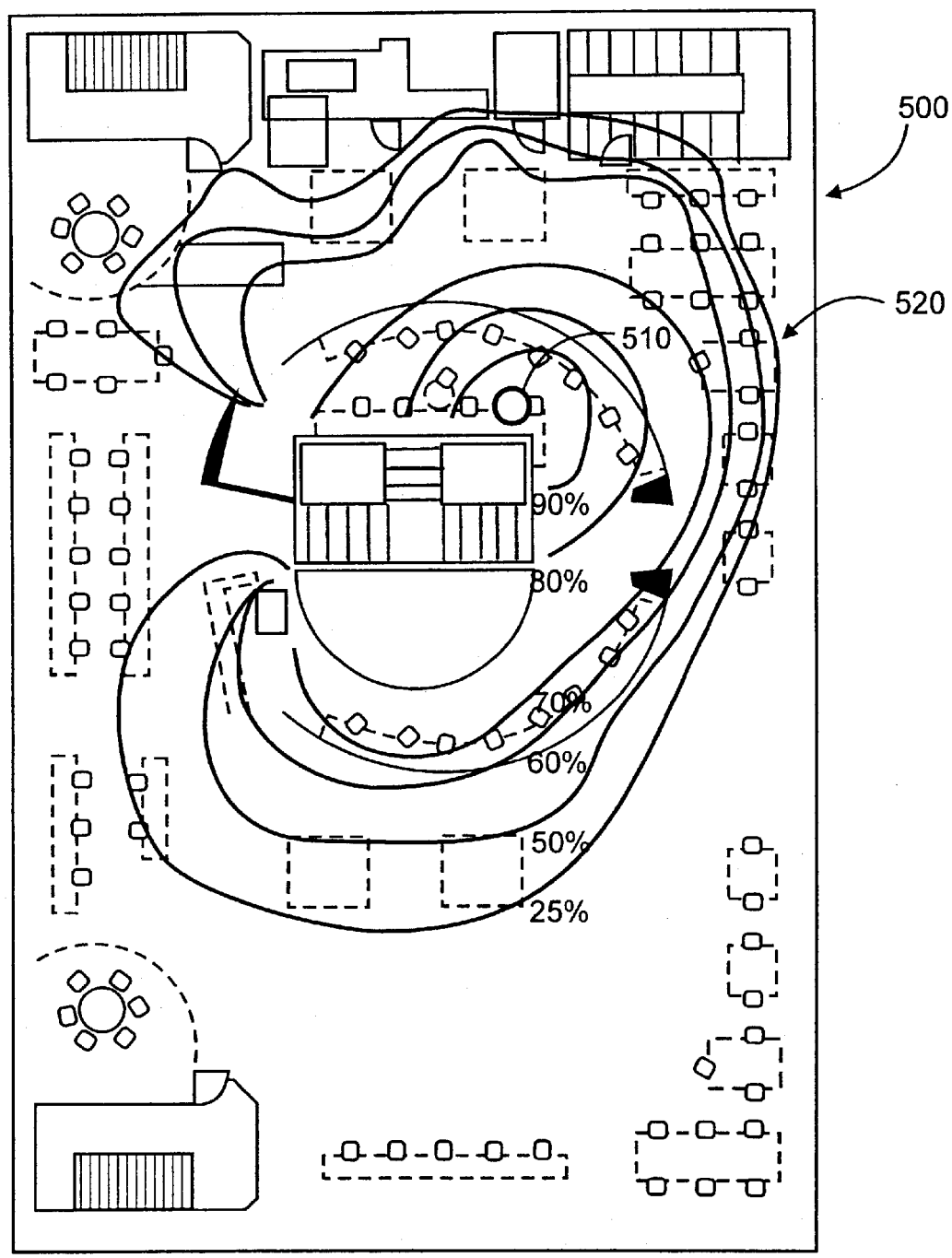
FIG. 5 is a view of a distorted signal strength field pattern superimposed on a digital map.

FIG. 5 provides a representative top view 500 of a distorted signal strength field pattern 510 combined or superimposed over a digital floor plan 520 for a single access point 510 in a defined space. FIG. 5 demonstrates how the traversable locales within the defined space can have different signal strength profiles and how different adjacent locales will also have differing signal strength characteristics.

Up to this point, a few assumptions have been made, namely the use of a single access point with a uniform communication pattern and orientation. Also, no mention has yet been made of how the statistical model is built or applied for tracking, its resolution, its reliability, whether readings are made from the mobile communications terminals or the (presumed) fixed deployment of the communications media network, as well as the placement of the access points.

With the digital map of the physical space defined, the signal strength model can be generated. The process of generating a signal strength model is referred to as "training" the area or system. Accordingly, the mobile device detection and tracking system 100 includes a signal strength modeler 160 that can access the digital map 200 in database 105. In accordance with the present invention, the signal strength modeler 160 can be configured to create the signal strength model in one of at least two manners. In a first manner, access points 110 are installed in the physical space and actual signal strength data is collected through migration of a transmitting mobile device 120 through the space. The actual signal strength data received from the access points 110 are used to build a statistical signal strength model associated with the digital map 200 of the physical space. Any one or more of a variety of known statistical modeling approaches may be used to build the signal strength model.

That is, according to this approach, building the statistical signal strength model includes performing a communications signal strength survey of the defined space. This comprises deploying one or more communications medium access points 110 in the defined space and performing a walkthrough of accessible areas within the defined space. The communication access points 110 can either be used as signal sources to be measured by the mobile communications device 120 during the survey, or serve as listening posts measuring the signal strength from said mobile device 120. Despite the fact the both training methodologies vary in the number, source, and values of readings obtained, what matters is that data exists through the survey to develop a profile of various locales within the defined space.

The resulting data collected from the survey can be used by the signal strength module 160 in a few different manners to develop a statistical model, namely a manual approach and an automated approach. In the manual approach, the model developer merely selects the areas of primary interest or locales on the digital map of the space for which to build the model and to determine position of the access points 110. This limits the areas in which the access points 110 can be located to where the planner designates. The automated approach, instead, involves using a statistical technique to deduce the number of highly recognizable locales with strongly distinctive signal profiles either by the user specifying the number of locales or a designated statistical confidence factor.

Another manner of building the statistical model includes using simulated access points and simulated mobile device readings within the context of the digital map 200 of the physical space. In such a case, the signal strength modeler 160 assumes certain reception and transmission characteristics of the access points 110 and of the mobile devices 120 within the context of the space in digital map 200. The statistical signal strength model is generated as a function of these assumptions. Preferably, the system 100 allows for editing the assumptions (including the positioning of obstructions and access points) to yield different statistical models using the user interface of the system.

More specifically, in the preferred embodiment, training may done by collecting labeled data for each location. The data is uniquely labeled and associated with its corresponding access point. The data is a set of "samples", each of which has a measurement from one or more access points, averaged over a period of time. Many of these samples (typically about 25) compose what is called a "signature". In some forms, the use of unlabeled data could be used to augment or replace the existing data, but preferably the association with an access point is retained. Further, the signatures may be composed of fewer than about 25 "samples", either by simply collecting fewer, by automatic decimation, or by algorithmic selection of which samples to retain. Of course, collecting more samples could also be useful. In yet other forms, the signatures could be changed in representation from a set of "samples" to any number of other schemes, including using support vector machines (SVMs) or a similar schemes to select critical "samples", gauassian clusters to estimate the densities, or any number of other density estimation schemes.

From these signatures, "silhouettes" are generated internally. In the preferred implementation, each signature yields a silhouette. However, in other forms, silhouettes composed of multiple signatures could be generated, if useful. A silhouette is generated by examining each "source" sample in a signature and identifying the other (i.e., "target") samples (from all "signatures" combined) that are densest in the vicinity of that source sample, as discussed below with respect to terraced density estimation. A source sample is a sample from a sample set, associated with an access point, and selected for processing and a target sample is a sample from the same sample set that is not the sample being processed, but is used for reference, comparison or otherwise in relation to the processing of the source sample. In other forms, target samples could come from other sample sets. The signature that is the most heavily represented in these resultant target sample densities is counted. This is done for each source sample in a signature and the resulting count of target signatures is tallied and becomes a silhouette. Most of the operations done in post processing (i.e., operation) are performed on silhouettes, though it is often presented in the user interface as signatures. This is done because there is a one-to-one mapping between them, and it avoids confusing the user if silhouettes are not mentioned at all.

A terraced density estimation scheme is used to estimate signature sample densities, primarily for convenience of implementation. In the preferred form, a Parzen Window scheme with a series of stacked box kernels is used, as will be appreciated by those skilled in the art. However, as will also be appreciated, any number of other known density estimation schemes could be utilized to good effect. Other techniques include a variety of other kernel based estimation schemes as well as k-nn or gaussian clustering.

These manual, semi-automated and automated techniques make use of a statistical mechanism to provide a correlation of the communication signal strengths obtained during the survey walkthrough with locales in the defined space. Such a statistical model can be implemented by the signal strength modeler 160 using a Markov model, with the state variable representing the locales within the defined space and transition probabilities representing the movement likelihood between them. The Markov model used could be either continuous or discrete, affected by the desired tracking resolution, number of signal sources or access points and their variations over the space. The signal strength modeler 160 can generate the statistical signal strength model using the Markov model, or it can be the result of applying some other probabilistic fitting technique to represent the signal strength distribution in locations of interest or locales. Similarly, multiple distributions can be employed to represent the impact of different environmental profiles, such as but not limited to, time of day, expected communications network load, transient environmental factors, and other physical or weather related phenomenon.

As mentioned earlier, either the mobile communications device 120 or the communication media access points 110 can be used as the source of the signal medium for the purposes of the survey. During active use (i.e., post-training), the same configuration would be employed with which to provide readings to the statistical model to determine the location and movement of the mobile device 120, by a location and tracking manager 170. In a preferred embodiment, the decision to deploy the live tracking data collection on the mobile device or "behind the scenes" on the communications medium's background network 115 can be influenced by a number of practical considerations. If communications bandwidth is scarce, then it may be preferable to have the mobile device 120 merely communicate and have all tracking related data collection occur on the backend network 115. If the computational resources of communication's backend network 115 cannot scale to support computing the locations of the all mobile devices to be tracked, the mobile communications device 120 can instead collect signal strength data from the access points 110, apply the statistical model locally to compute its location, and relay the result to the backend network 115. Or, depending on the deployment scenario and the specific capabilities of the mobile device 120, a suitable mixture of both techniques can be applied.

Figure 3B:
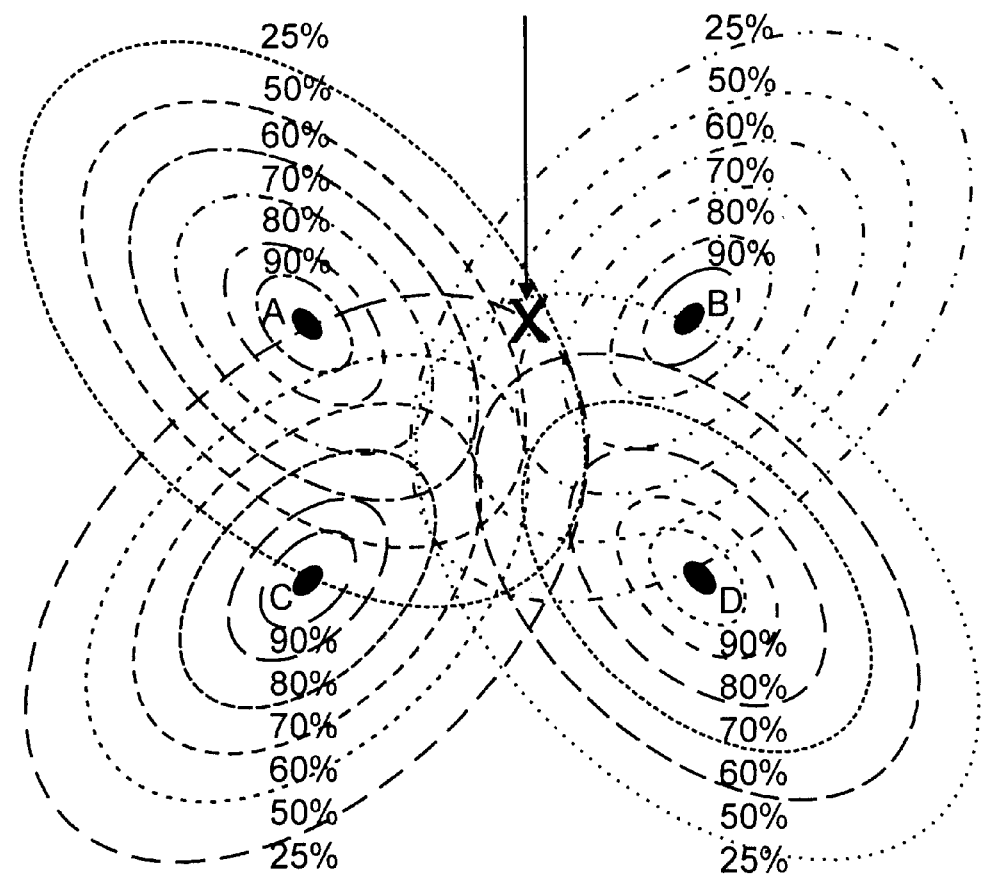

As shown in FIG. 5, it is possible to track the position of multiple locations in the defined space 500 using a single access point 510, as detected by the mobile device 120. However, this technique is equally valid when using multiple sources, or communications access points 110. Properly placed communications access points 510 can provide another independent signal profile greatly improving the accuracy of the position detection and motion tracking that can resolve ambiguities arising from symmetries or similar signal strength distributions 520 from a single source 510. In the limit, the addition of multiple access points 110 can be thought of as a multidimensional system, whose coordinate indices begin to uniquely and accurately define more and smaller locations in the space, as indicated in FIG. 3B. In FIG. 3B, each access point A, B, C and D has its own signal strength pattern, wherein "X" is located at about A=50%, B=60%, C=25% and D=50%.

The resolution of such a statistically based, environmentally sensitive system is based on a number of factors, comprising the number and complexity of environmental obstructions, the number of communications access points 110 and their placements, and the scalability of the communications medium itself. The inventors have tested a single communications access point system with over 6 locations in an open-plan office space, with each location having a tracking accuracy of a few meters. The primary factor that affects the resolution is the dynamic range of the access point signals themselves. Through the addition of communication access points 110 with specific signal pattern profiles having significant variation in signal strength over the desired space, the location tracking can improve substantially. Naturally, despite the predicted or expected resolution of a system, an actual deployment may have to consider interference from other unanticipated sources or that the orientation of the communications signal transducer on either the communications access point 110 or the mobile device 120 play a factor in the accurate measurement of signal strength.

The placement of the communications access points 110 is presumed fixed since most such communications infrastructure is connected to some backend network 115 fixed in location. A mobile communications access point infrastructure could be used if there exists a predictable movement or periodicity to the position of the access points 110, or if a frame of reference can be established in conjunction with another means of position detection, such as GPS. Given a sufficient number of communication access points 110, it would be possible to deduce the relative location of the mobile communications devices 120 without necessarily knowing the positions of the communications access points 110 by applying the appropriate geometric constraints. Assuming a fixed placement of communications access points 110, the survey technique previously described can be used to determine an optimal placement of the access points 110 to maximize both communication signal coverage and tracking accuracy throughout a given defined space. The preferred embodiment suggests that the placement of communications access points 110 such that any spatial symmetry is broken relative to the traversable paths that maximize the dynamic range variation where possible. Different heuristics can be applied for different spatial geometries and the number of communications access points to be deployed.

Accordingly, in some forms, the mobile device detection and tracking system 100 may include a module, e.g., AP manager 190, for determining the placement of the access points 110 within the defined space. In such a case, the space in digital form is defined, including a definition of the obstructions. Obstructions may be assigned values relating to the amount of interference they tend to provide. For example, a brick wall typically provides a greater amount of interference than does a window. Analyzing the interference characteristics in light of a range of signal strengths from a foreseeable set of mobile devices 120 and in light of the detection and transmission characteristics of the access points 110, allows access point placement to be determined. If there are access points having different detection and transmission characteristics identified in the system 100, the mobile device detection and tracking system 100 may not only determine placement, but also selection of access points 110. In some forms, the system 100 may also determine placement of the access points with respect to the locales.

With the defined space having been trained, position detection and motion tracking are accomplished under the control of a location and tracking manager 170 within and among the locales by processing actual signal strength data of a mobile device 120 as it moves about the defined space, and comparing the actual data against the known statistical signal strength model. At any one time, mobile device 120, while transmitting in the trained space, may be detected by a plurality of detectors or access points 110, which may be in the same or different locales. A comparison of the actual signal strength data at each access point receiving the mobile device's 120 signal with the signal strength patterns (included in the signal strength model) of those access points 110 allow for a determination by the location and tracking manager 170 of the real-time location of the mobile device 120 within the defined space. Such analysis, when performed overtime, allows tracking of the mobile device within and among the locales. The location and tracking manager 170 may be used to "push" services, data, or other content to the mobile device 120, or to "pull" information from the mobile device 120, or to queue the mobile device to pull services from the network.

During operation (i.e., runtime), as in training, data from the mobile device 120 is collected into samples, which are vectors composed of averaged signal strengths from one or more measurement station. An absent vector component is distinct from a present component with value 0. Several variations are also possible, including "renormalizing" the raw collected data based on known RF propagation properties or qualities of the signal strength information provided by the media access controller (MAC) chip, such as are commercially available and known in the art.

To improve the accuracy and reliability of tracking, the location and tracking manager 170 may include functionality that implements the concept of locale adjacency. That is, with reference to FIG. 2, where locale D is only adjacent to locale B1 and locale F and, according to signal strength data, the mobile device 120 could be in locale B1 or a locale A, knowing that the previous locale of the mobile 120 was locale D allows the system 100 to accurately determine that the mobile device 120 is currently in local B1, and not locale A.

The concept of adjacency may be implemented in a state-based approach. In such a case, each locale may be uniquely modeled as state within a state diagram. Since only a finite number of known next states and previous states can exist for each state, a current state can be determined with greater reliability given knowledge of the previous state and its subset of allowable next states.

More specifically, as part of the tracking process, the location and tracking manager 170 may include functionality for location prediction, which may be done in two stages. First, as incoming samples are collected, the density of each of the trained signatures are measured, and the corresponding silhouettes are identified. A counter for each of these silhouettes is incremented according to their local density. Each of these counters is then adjusted by normalizing the sum of all of the counters. Second, the counters are adjusted based on an "adjacency" number, which identifies how likely mobile device 120 is to be in a particular silhouette, given that it was in a particular silhouette immediately beforehand. This means that if a device is predicted to be in silhouette A, and is immediately afterward predicted to be equally likely to be in B or C, and B is "adjacent" to A, it will select B. As a result, silhouettes are typically going to have reasonably high "self-adjacency", given that an immediately prior prediction is likely the best a priori estimate of a device location. Following this temporary adjacency adjustment, the highest valued silhouette is selected and mapped to a locale. One or more silhouettes may correspond to the same locale.

Figure 6:
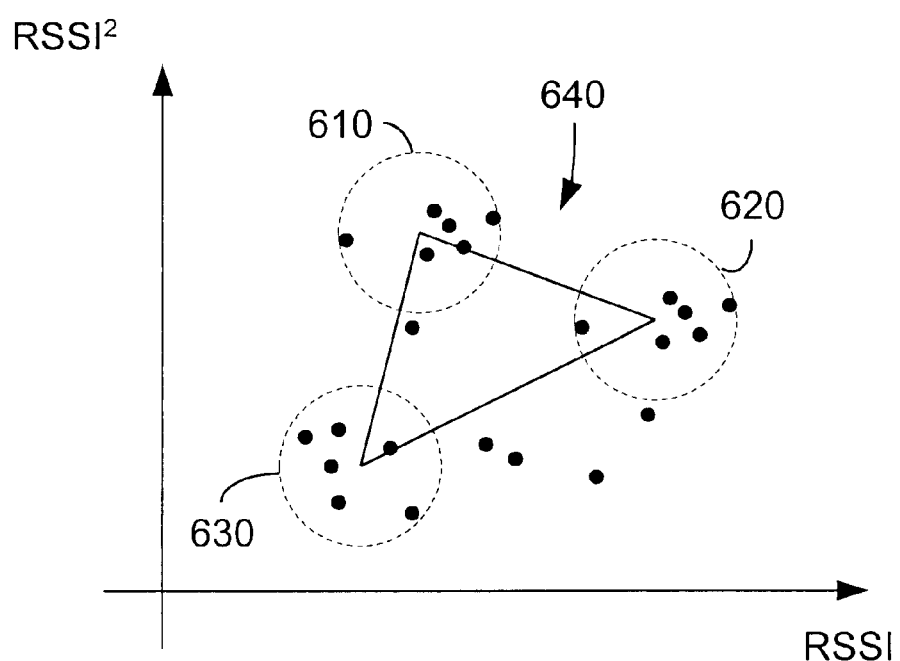
FIG. 6 is a diagram depicting RSSI clustering and trilateration implemented by a mobile device location and tracking system in accordance with the present invention.

Referring to FIG. 6, in various forms of the present invention, a combination of approaches may be implemented to locate and track a mobile device through the defined space and from locale to locale. For example, using clustering statistics of received signal strength indicator (RSSI) data from one or more access points, a determination of the location of the mobile device can be made with relatively high accuracy, as is known in the art. For instance, clusters 610, 620, and 630 exist from three different access points. Additionally, a trilateration analysis of RSSI data received from three different access points can be performed, wherein the location of the mobile device can be determined as a function of the length of the sides of a triangle 640 formed by data received from the three access points. Unlike prior approaches, the results of the clustering statistics and the trilateration can be combined to increase the accuracy of the overall determination of the location of the mobile device 120. This approach can also be performed over time for improved tracking.

In the presence of obstacles, strict trilateration would be error prone or grossly inaccurate for performing location-tracking based on signal-strength. In such cases, the mathematical model that maps signal-strength to distance could potentially yield that same resulting values for different locales, leading to incorrect locale or position identification. By utilizing signal-strengths from multiple access points via a statistical model, these multiple potentially different mapping functions can be combined in such a way to compensate for position inaccuracies due to a single access point's readings. Essentially, rather than utilizing a conventional trilateration based on signal-strength, the signal-strengths (as an aggregate) are effectively combined into a statistical trilateration mapping function performed as a result of collecting live training data in each locale of interest, generated from a simulation model of the RF effects in a space, or deduced by examining uniquely and reliably identifiable locales from data collected during an RF survey through the entire space, as previously discussed.

Various forms of the present invention may include a feedback subsystem or monitor 180 that monitors the status of the access points 120, and may also interface with access point manager 190. For instance, such a subsystem may be configured to determine if an access point is malfunctioning, turned off or inoperable, if a new detector has been added, or some combination of the foregoing. In such a form, a feedback path is provided between the access points 110 and monitor 180. The monitor 180 obtains status data provided by each access point, which is used for the above determinations, and produces status messages, error messages or both. The messages may come, as an example, in the form of an e-mail or a telephone alert to a network administrator, technician, manager, security personnel, or some combination thereof. In some forms, a system and method in accordance with the present invention may adjust the statistical signal strength model in response to loss or malfunctioning of one or more access points. In other forms, in concert with the location and tracking manager, data from certain access points 110 may be selectively suppressed, in order to reduce ambiguity in signal strength data. Using the feedback mechanisms, network (e.g., wireless LAN) status and access point layout can be monitored. Feedback can also serve to improve simulation modeling and provide error correction estimates, by comparing actual versus simulated data, for instance. Feedback may also be used to improve and determine changes useful the training model, by providing greater accuracy through analysis of signal strength and access point information used during training.

Those skilled in the art will recognize that the present invention has a broad range of applications, and the embodiments admit of a wide range of modifications, without departure from the inventive concepts. In a variety of such embodiments, a system in accordance with the present invention can form the basis of a system and method for providing location and context aware communication and data services to the holder of the communications device. For example, the illustrated embodiment can be used to track the location and motion of consumers carrying a mobile communications device in a commercial retail establishment, employees in an office buildings, equipment and parcels in a manufacturing or shipping facility, or attendees at a conference in a convention center. In other examples, when migrating through an exhibit or museum, content or data describing or relating to a proximate exhibited item may be delivered, but which changes as the user changes location. In an academic setting, information (such as notes, exams, and dynamic audiovisual content) may be delivered to a student and/or a professor as a function of the classroom he occupies (e.g., as a locale) and the time of day. In a medical setting, patient information delivered to a doctor or nurse may be delivered as a function of the patient then assigned to the room or bed that the doctor or nurse is visiting.

In any of a variety of embodiments, beyond content, functionality, and data delivered or made accessible as a function, at least in part, of location, the user of the mobile device 120 may receive location, tracking, locale, or region of interest information, or some combination thereof via the GUI manager 140. In such cases, the user may be provided with audio, graphical, text or print information, or some combination thereof. The foregoing information may be static or dynamic and it may be provided via the a GUI of other output means. In such cases, the GUI may display some or all of the digital floor plan as well as the current location of the mobile device 120. It may also display historical information, such as the path taken through the defined space.

Figure 7:
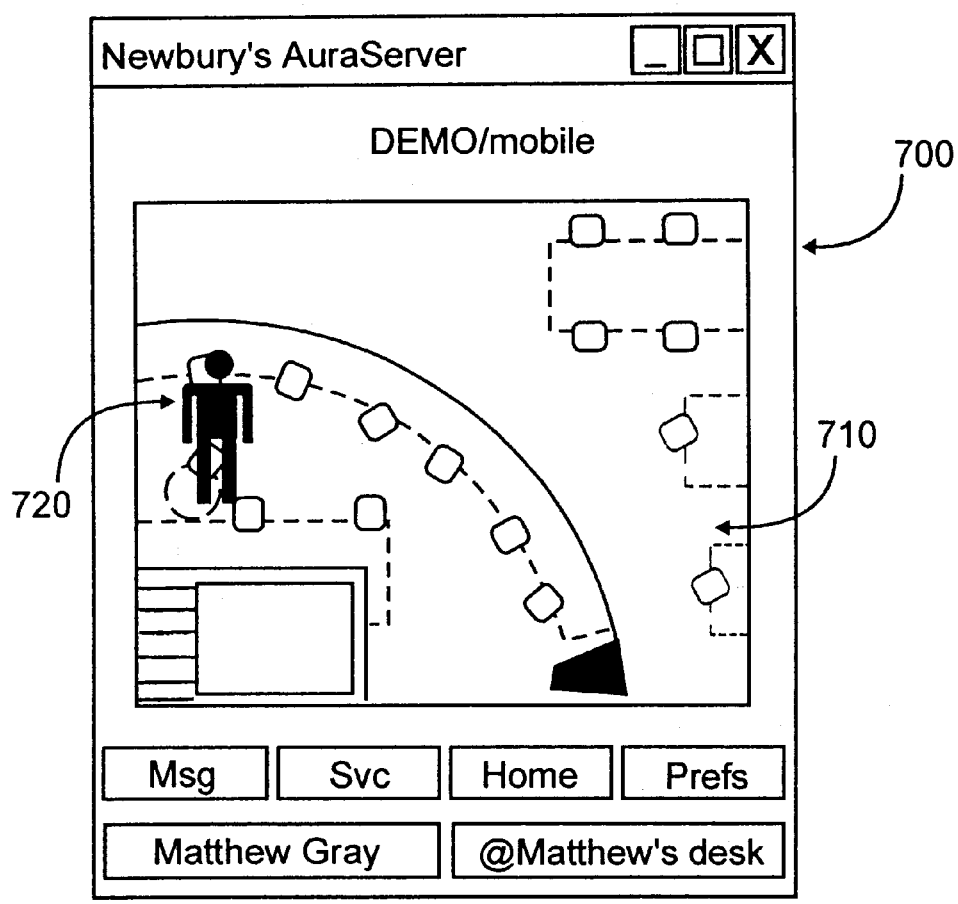
FIG. 7 shows a sample mobile communications device graphical user interface (GUI) where the current location of the user is depicted on a digital map.

FIG. 7 shows a screen shot 700 of a representative GUI having content supplied from the mobile device detection and tracking system 100, and that may be provided on mobile communications device 120. GUI 700 is shown displaying a portion of a digital floor plan map 710. Superimposed on the digital floor plan is an icon 720 indicating the position of the user of the mobile device 120 within the defined space.

In other embodiments, the system 100 may include a routing function configured to plot a route or path between two locations within the locale or defined space, in digital form. The GUI manager 140 could also track the progress of the mobile device 120 against a plotted route. In still other forms, functionality may be included to provide indicia via the mobile device 120 of functionality, rights, privileges, data and access that would be available to the mobile device user at different locales within the defined space, e.g., by rendering a pop-up text message box or icon in response to the user selecting or inputting indicia of a locale. That is, with reference to FIG. 2, if the user enters locale C1 he will be enabled to received e-mail.

In additional to contextually aware functionality presented to the mobile user in the defined space, information can be collected and utilized to analyze where various workflow bottlenecks may exist or other spatially related challenges arise. For example, knowing the motion of the mobile device 120 can be used to allow the communication network 115 itself to anticipate handoff to a set of communication access points 110 and preemptively prepare for a possible network handoff of the mobile devices' 120 communication. Another example of macroscopic or behavioral analysis of the mobile communication terminals or devices 120 would be traffic monitoring in a supermarket, shopping mall, or convention center to better market, position, or place products and services in the future.

While the foregoing has described what are considered to be the best mode and/or other preferred embodiments, it is understood that various modifications may be made therein and that the invention or inventions may be implemented in various forms and embodiments, and that they may be applied in numerous applications, only some of which have been described herein. As examples, sliding data collection could be used. That is, currently each sample is generated based on a fixed width window, which sometimes results in absent vector components for which there may be reasonably recent measurements. A variable width window which weights recent data more significantly could be used instead to make use of such data. Hidden Markov Model (HMM) based training and prediction could be used, wherein instead of the silhouette approach, a signature match could be treated as a symbol to be used in an HMM where the internal states would correspond to the locations. This would also enable training without labels, where labels would be applied at some later point. With continuous HMM prediction, the raw signal measurements could potentially be provided to a continuous HMM for prediction. In other forms, heuristic data or other sensors (e.g., cradles, IR, etc.) could be readily injected as high quality signature matches. In other forms, adaptive training data could be used, wherein various clustering algorithms or other approaches could be employed to allow the training data to adapt to gradual environmental changes. In yet other forms, time embedded vectors could be used, wherein rather than relying solely on the existing adjacency numbers, the feature vectors could be made into time embedded vectors. Also, parameters, such as measured RSSI variance could be incorporated into the training/prediction vectors. In yet other forms, application of SVM or other kernel machine algorithms may be implemented.

As used herein, the terms "includes" and "including" mean without limitation. It is intended by the following claims to claim any and all modifications and variations that fall within the true scope of the inventive concepts.

What is claimed is:

1. A wireless device location and tracking system, comprising:
    A. a network, including a plurality of uniquely identified network devices linked to one or more computing device coupled to a set of storage devices, wherein said network devices are configured to determine the signal strength of transmissions of a wireless device and for each network device there is defined an associated signal strength model;
    B. area data stored within said set of storage devices and defining an area comprised of a set of defined locales; and
    C. a location module coupled to said network and configured to:
        1) create and maintain a state diagram related to said wireless device, wherein each state in said state diagram corresponds to at least one of said set of locales; and
        2) determine a present location of said wireless device as a funtion of a correlation between a set of passively received signal strength data obtained from the wireless device, at least one signal strength model and a prior state of said wireless device.

2. A system as in claim 1, further comprising at least one application subsystem coupled to said network and including one or more applications, whrein said location module is further configured to:
    3) selectively allow access by said wireless device to said one or more applications as a function of the present location of said wireless device.

3. A system as in claim 1, wherein said location module is further configured to:
    3) selectively allow access by said data in said storage devices as a function of the present location of said wireless device.

4. A system as in claim 1, wherein said network includes a wireless locale area network.

5. A system as in claim 1, wherein said area data includes a digital definition of the area, including physical obstructions located therein.

6. A system as in claim 1, wherein said area data includes a statistical signal strength model correlated to said area.

7. A system as in claim 6, wherein said statistical signal strength model includes a pattern of signal strength data anticipated from a mobile device transmitting within the area.

8. A system as in claim 6, wherein at least a portion of the signal strength data used to generate said statistical signal strength model is data from said network devices.

9. A system as in claim 1, wherein said location module is further configured to compare said signal strength data against a signal strength model.

10. A system as in claim 1, further comprising:
    D. a tracking module configured to track the wireless device as a function of a plurality of present locations determined over time.

11. A wireless device location and tracking system, comprising:
    A. a network, including a plurality of uniquely identified network devices linked to one or more computing device coupled to a set of storage devices, wherein said network devices are configured to determine the signal strength of transmissions of a wireless device and for each network device there is defined an associated signal strength model;
    B. area data stored within said set of storage devices and defining an area comprised of a set of defined locales, wherein each locale includes at least one network device; and
    C. a location and tracking module coupled to said network and configured to determine a locale of said wireless device within the set of defined locales as a function of correlation between a set of received signal strength indicator (RSSI) values derived from passively sensed signal strength data obtained from the wireless device and from at least one signal strength model, wherein said location and tracking module is configured to determine said location without data processing or message generation by said wireless device.

12. A wireless device location system, comprising:
   A. a network, including a plurality of uniquely identified network devices linked to one or more computing device coupled to a set of storage devices, wherein said network devices are configured to determine the signal strength of transmissions of a wireless device and for each network device there is defined an associated signal strength model;
   B. area data stored within said set of storage devices and defining an area comprised of a set of defined locales; and
   C. a location module coupled to said network, comprising:
      1) a clustering module, configured to apply pattern recognition to dynamically changing signal strength data derived from transmissions from said wireless device;
      2) a trilateration module, configured to determine distances of said wireless device from a plurality of said network devices as a function of said dynamically changing signal strength data; and
      3) a location determination module, configured to determine a present location of said wireless device as a function of said pattern recognition and said distances.

13. A system as in claim 12, further comprising:
   D. a tracking module configured to track the wireless device as a function of determination of a plurality of present locations over time.

14. A wireless device location system, comprising:
   A. a network, including a plurality of network devices linked to one or more computing device coupled to a set of storage devices, wherein said network devices are configured to determine the signal strength of transmissions of a wireless device and for each network device there is defined an associated signal strength model, and wherein said set of storage devices includes network device data uniquely identifying each of said network devices;
   B. area data stored within said set of storage devices and defining an area comprised of a set of defined locales, wherein each locale includes at least one network device; and
   C. a location module coupled to said network and configured to determine a locale of said wireless device within the set of locales as a function of a correlation between a set of received signal strength indicator (RSSI) values derived from passive signal strength data obtained from the wireless device and from at least one signal strength model, said module comprising:
      1) an RSSI module, configured to apply pattern recognition to dynamically changing signal strength data derived from passively sensed transmissions from said wireless device; and
      2) a feedback module, coupled between an output of said RSSI module and said set of storage devices, wherein said feedback module is configured to verify that network devices receiving the signal data correspond to the network device data in said set of storage devices.

15. A system as in claim 14, further comprising:
   D. a tracking module configured to track the wireless device as a function of determination of a plurality of present locations over time.

16. A method of locating a wireless device in an area including a plurality of network devices linked via a network to one or more computing devices and a set of storage devices, wherein for each network device there is a defined signal strength model, said method comprising:
   A. defining a set of locales within said area and representing said locales as area data within said set of storage devices;
   B. defining a state diagram representing said locales;
   C. determining signal strength data from said wireless device by one of more of said network devices, without data processing or message generation by said wireless device;
   D. determining a prior state, if any, of said wireless device as a function of said diagram and said signal strength data; and
   E. determining a present location of said wireless device as a function of said prior state, at least one signal strength model and said signal strength data.

17. A method as in claim 16, wherein said computing devices include at least one application subsystem coupled to said network and including one or more application, said method further comprising:
   F. selectively allowing access by said wireless device to said one or more applications as a function of the present location of said wireless device.

18. A method as in claim 16, further comprising:
   F. selectively allowing access to data in said storage devices as a function of the present location of said wireless device.

19. A method as in claim 16, further comprising:
   F. tracking said wireless device by determining a plurality of present locations over time.

20. A method as in claim 16, wherein part A includes defining said area data to include a digital definition of the area, including physical obstructions located therein.

21. A method as in claim 16, wherein part A includes generating a statistical signal strength model correlated to said area.

22. A method as in claim 21, wherein generating said statistical signal strength model includes defining a pattern of signal strength data anticipated from a mobile device transmitting within the area.

23. A method as in claim 21, wherein generating said statistical signal strength model is accomplished using data from said network devices.

24. A method as in claim 16, further comprising, in part E, comparing said signal strength data against a signal strength model to determine said present location of said wireless device.

25. A method of locating a wireless device in an area including a plurality of network device linked via a network to one or more computing devices and a set of storage devices, said method comprising:
   A. defining a set of locales within said area and representing said locales as area data within said set of storage devices;
   B. defining a received signal strength indicator (RSSI) model for each network device in said area, and stoning each RSSI model in said set of storage devices;
   C. determining RSSI data from said wireless device by one or more of the network devices, without data processing or message generation by said wireless device;
   D. determining by said computing devices a present location of the wireless device as a function of a comparison between the RSSI model and the RSSI data.

26. A method as in claim 25, further comprising:

E. tracking said wireless device by determining a plurality of present locations over time.

27. A method of locating a wireless device in an area including a plurality of network devices linked via a network to one or more computing devices and a set of storage devices, said method comprising:

A. defining a set of locales within said area and representing said locales as area data within said set of storage devices;

B. applying pattern recognition to dynamically changing signal strength data derived from transmissions from the wireless device;

C. determining the distances of said wireless device from a plurality of the network devices, as a function of said dynamically changing signal strength data; and D. determining a present location of said wireless device as a function of said distances.

28. A method as in claim 27, wherein network device data uniquely identifying each network device is represented in said storage devices, said method further comprising:

E. providing feedback of said signal strength data received by one more of said network devices; and F. verifying that network devices receiving signal strength data correspond to network devices represented by said network device data, using the feedback of said signal strength data.

29. A method as in claim 27, further comprising:

E. tracking said wireless device by determining a plurality of present locations over time.

* * * * *